Figure 1:
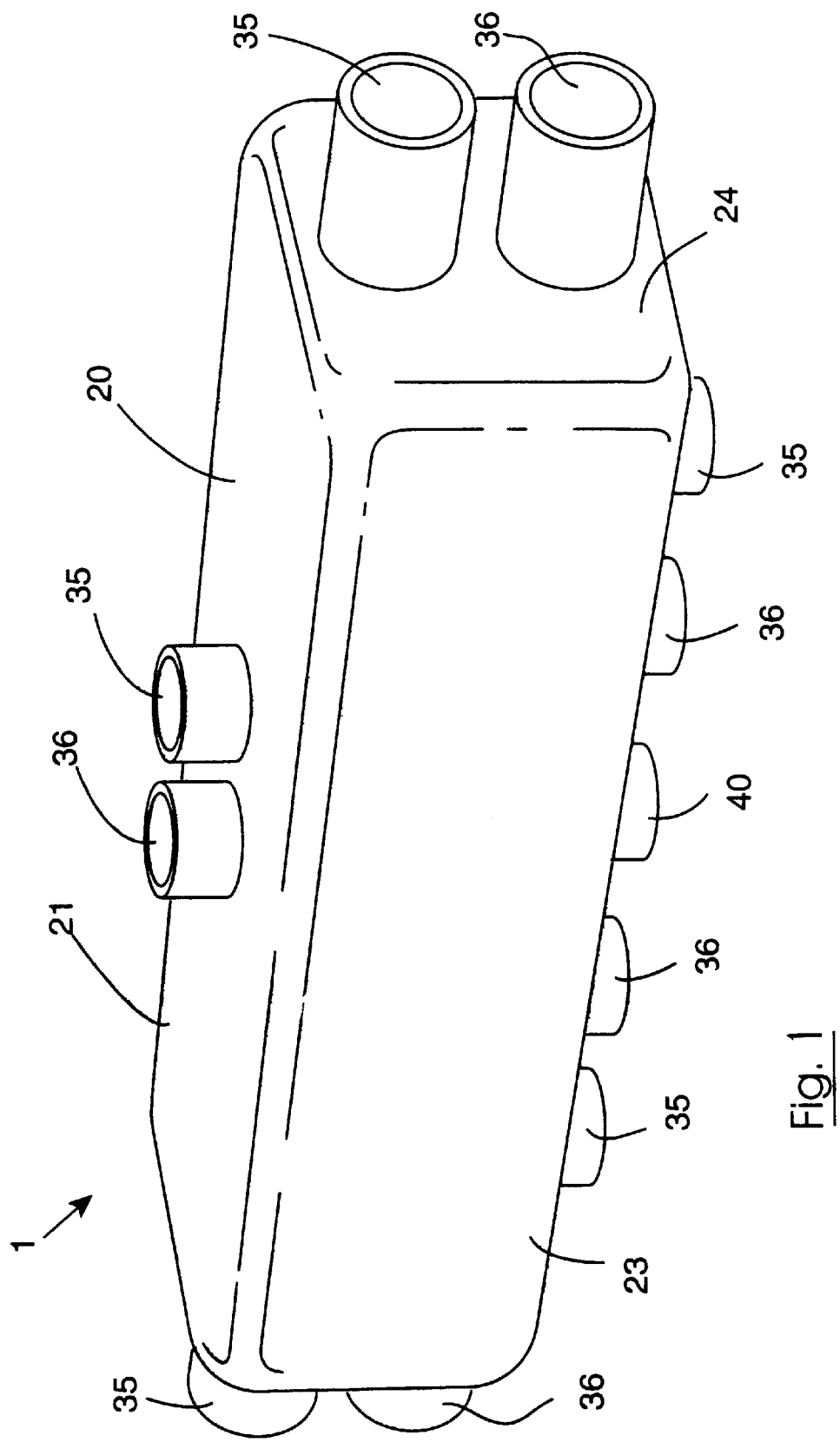

United States Patent [19]
Rea

[11] Patent Number: 6,092,734
[45] Date of Patent: Jul. 25, 2000

[54] MANIFOLD FOR CONNECTING CIRCUITS OF A CENTRAL HEATING SYSTEM

[75] Inventor: Harold A Rea, Cork, Ireland

[73] Assignee: Monard (Research & Development) Limited, Cork, Ireland

[21] Appl. No.: 09/043,004

[22] PCT Filed: Aug. 28, 1996

[86] PCT No.: PCT/IE96/00057

§ 371 Date: Mar. 2, 1998

§ 102(e) Date: Mar. 2, 1998

[87] PCT Pub. No.: WO97/08498

PCT Pub. Date: Mar. 6, 1997

[30] Foreign Application Priority Data

Aug. 29, 1995 [IE] Ireland .................................. S950663

[51] Int. Cl.[7] ...................................................... F24D 3/00
[52] U.S. Cl. .............................................. 237/8 R; 237/56
[58] Field of Search ............................. 237/8 R, 16, 59, 237/56

[56] References Cited

FOREIGN PATENT DOCUMENTS

| | | |
|---|---|---|
| 0387633 | 9/1990 | European Pat. Off. . |
| 4234960C1 | 10/1992 | Germany ...................... 237/12.3 B |
| 4234960 | 2/1994 | Germany . |
| 4407807 | 9/1995 | Germany . |
| 630166 | 5/1982 | Switzerland . |

*Primary Examiner*—Denise L. Ferensic
*Assistant Examiner*—Derek S. Boles
*Attorney, Agent, or Firm*—Sughrue, Mion, Zinn, Macpeak & Seas, PLLC

[57] ABSTRACT

A manifold connects three boiler circuits and a heat exchanger circuit and an indirect cylinder heated exchanger circuit of a central heating system together. The manifold comprises a container which defines a hollow interior region which is divided by a horizontally extending partition plate into an upper flow water region and a lower return water region. First ports are provided for connecting flow pipes of the circuits into the flow water region of the manifold and second ports are provided for connecting the return pipes of the circuits into the return water region of the manifold. A communicating opening and apertures in the partition plate communicate the flow and return water regions. The partition plate stratifies the water within the hollow interior region so that the hottest flow water is above while the cooler return water is below the partition plate. The manifold forms neutral pressure point in the system so that the circuit can operate independently of each other, while at the same the circuit operate in association with the boiler circuits.

20 Claims, 9 Drawing Sheets

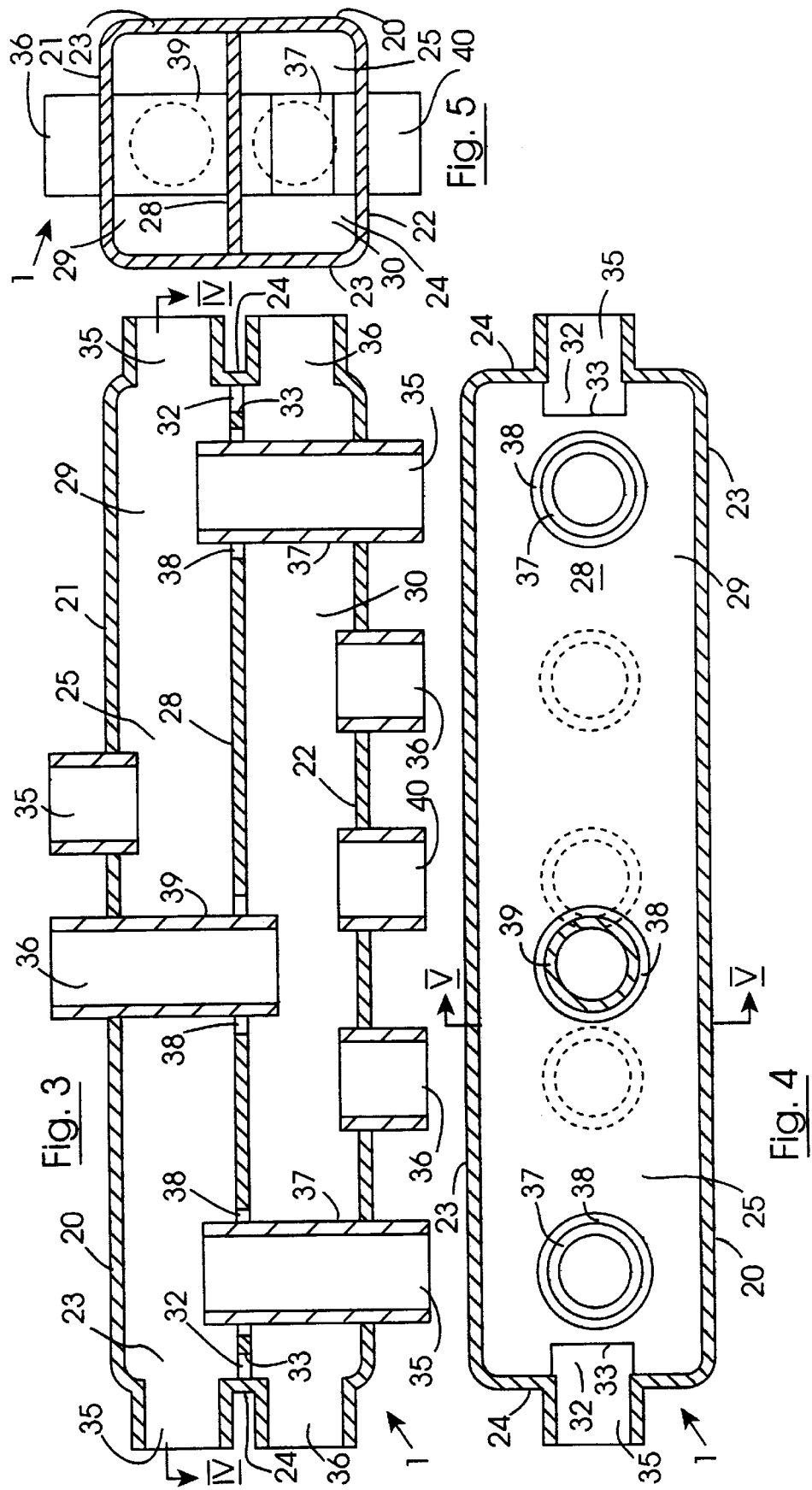

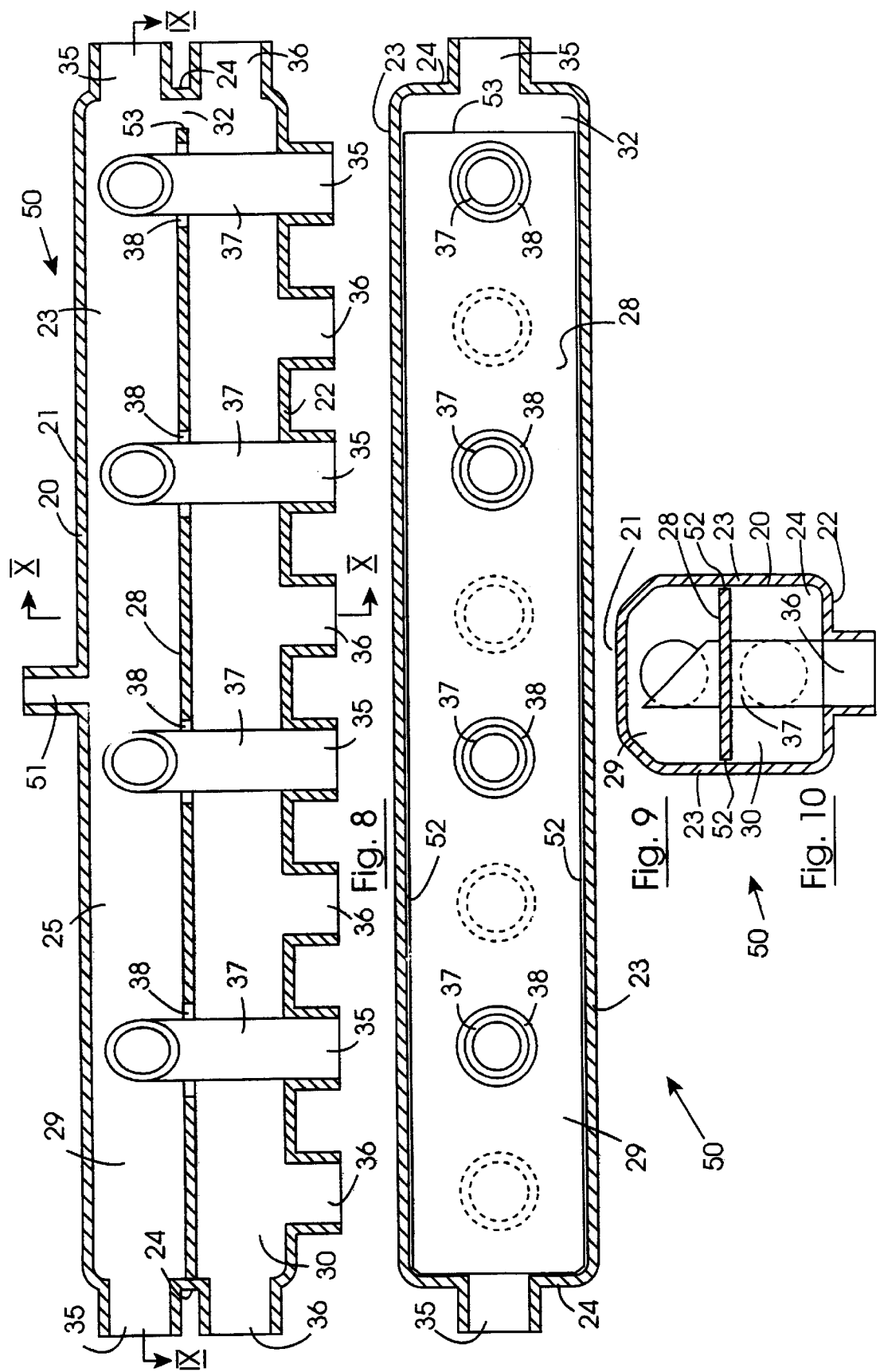

MANIFOLD FOR CONNECTING CIRCUITS OF A CENTRAL HEATING SYSTEM

The present invention relates to a manifold for connecting two or more circuits of a liquid, heat transfer medium central heating system, typically, a central heating system in which the liquid heat transfer medium is water, for example, a hot water central heating system, and the invention also relates to a central heating system.

In many cases, it is desirable to connect two or more circuits of a central heating system together. However, when connecting such circuits, it is desirable that at least some of the circuits should be capable of functioning independently of some of the other circuits, and in association with those and others of the circuits. For example, it is desirable that if two or more boilers are connected into a central heating system that the boiler circuits should be capable of being functioning independently of each other. In other words, when only one of the boilers is operating, the heat transfer medium should not circulate through the idle boiler or boilers. Otherwise, the idle boilers act as heatsinks. Additionally, should the central heating system comprise two or more circuits, each of which comprises a plurality of heat exchangers, for example, central heating radiators, or an indirect hot water tank, it is desirable that the two or more heat exchanger circuits should be capable of functioning independently of each other, but in association with one or more boiler circuits of the central heating system, so that heat transfer medium only circulates in those heat exchange circuits which are to be operated, and only through the boiler or boilers of the boiler circuits in which the boiler or boilers are operating.

In general, the only known satisfactory method of operating a central heating system with two or more heat exchanger circuits and one or more boiler circuits is to interconnect the respective circuits through a series of valves, typically solenoid operated valves. The solenoid valves are appropriately operated for connecting the heat exchanger circuits which are to operate to the corresponding boiler or boiler circuits for providing heated heat transfer medium to the appropriate heat exchanger circuit or circuits. Such interconnecting arrangements with solenoid valves, while they achieve the objective, require relatively complex control circuitry, and are relatively complex and expensive to install. The solenoid valves are relatively expensive, as is the control circuitry.

Attempts to interconnect two or more circuits of a central heating system have been made by the provision of a manifold, however, to date all such attempts have been relatively unsuccessful. Known manifolds tend to be relatively inefficient. In such known manifolds colder return heat transfer medium from a heat exchanger circuit tends to be recirculated through the flow line of that or another heat exchanger circuit. It has been found that at best the colder heat transfer medium from a heat exchanger circuit mixes with the warmer flow heat transfer medium received from a boiler circuit in the manifold, and a mixture of the flow and return heat transfer medium is circulated through the flow line of the heat exchanger circuits. This, is inefficient and is undesirable.

There is therefore a need for a manifold for connecting two or more circuits of a liquid, heat transfer medium central heating system together which overcomes the problems of known manifolds.

The present invention is directed towards providing such a manifold, and a central heating system incorporating the manifold.

According to the invention there is provided a manifold for connecting at least two circuits of a liquid, heat transfer medium central heating system in which the circuits each comprise a flow line and a return line, so that at least some of the circuits can function independently of each other and at least some of the circuits can function in association with each other, the manifold comprising a container defining an enclosed hollow interior region for the heat transfer medium, and a plurality of pairs of first and second ports to the hollow interior region for connecting the respective circuits to the hollow interior region, the first ports being provided for connecting the flow lines of the respective circuits into the hollow interior region, and the second ports being provided for connecting the return lines of the respective circuits into the hollow interior region, characterised in that a partitioning means extends transversely of the hollow interior region for dividing the hollow interior region into a flow heat transfer medium region and a return heat transfer medium region, the respective regions communicating with each other through a communicating means in the partitioning means, the first ports communicating with the flow heat transfer medium region, and the second ports communicating with the return heat transfer medium region.

The advantages of the invention are many. The manifold according to the invention is particularly efficient in use, is easy to install, and also relatively inexpensive to provide and install. It can be installed without the need for any complex control circuitry. By virtue of the fact that a partitioning means divides the hollow interior region into a flow heat transfer medium and a return heat transfer medium region, and the first and second ports communicate with the respective regions, there is little mixing if any of flow and return heat transfer medium in the manifold. Thus, heat exchanger circuits receive flow heat transfer medium at a temperature substantially at that at which it is received into the manifold from a boiler circuit, without being diluted by the cooler return heat transfer medium, and likewise, the cooler return heat transfer medium from the heat exchanger circuits is returned directly to the boiler or boilers which are operating without being diluted with hotter flow heat transfer medium. The communicating means for communicating the flow and return heat transfer medium regions through the partitioning means causes the manifold to create a neutral pressure point in the central heating system which ensures that the respective circuits which are connected to the manifold operate independently of each other, while at the same time permitting heat exchanger circuits to operate in association with boiler circuits.

Preferably, the partitioning means comprises a partition plate.

By providing the partitioning means as a partition plate a particularly convenient and advantageous form of the manifold is provided.

In one aspect of the invention the partitioning plate extends substantially completely across the hollow interior region.

Preferably, the communicating means is provided by at least one communicating aperture which is formed in and extends through the partitioning means for communicating the respective regions with each other.

Advantageously, the communicating means is provided by a communicating opening which is formed between the partitioning means and a wall of the container.

The provision of the communicating means in the form of an aperture through the partitioning means facilitates the formation of the neutral pressure point in the hollow interior region, while at the same time, minimising mixing between the flow and return heat transfer medium. This effect is also achieved by forming the communicating means between the partitioning means and a wall of the manifold.

Preferably, the first and second ports are located in pairs of adjacent first and second ports.

The provision of the first and second ports in pairs facilitates ease of installation of manifold.

In one embodiment of the invention at least one of the first ports is located in a wall of the container which forms part of the return heat transfer medium region, and a first connecting pipe extends from each of said first ports through the return heat transfer medium region and through the partitioning means for communicating the respective said first ports with the flow heat transfer medium region.

In another embodiment of the invention at least one of the second ports is located in a wall of the container which forms part of the flow heat transfer medium region, and a second connecting pipe extends from each of said second ports through the flow heat transfer medium region and through the partitioning means for communicating the respective said second ports with the return heat transfer medium region.

Preferably, the partitioning means lies in a plane which extends horizontally, the flow heat transfer medium region being located above the return heat transfer medium region for stratifying the heat transfer medium in the hollow interior region so that the hotter heat transfer medium is in the flow heat transfer medium region.

In one embodiment of the invention the container is an elongated container.

In another embodiment of the invention the container is adapted for mounting with its longitudinally extending axis extending substantially horizontally.

In an alternative embodiment of the invention the container is adapted for mounting with its longitudinally extending axis extending substantially vertically.

A particularly important advantage of the invention is achieved by arranging the partitioning means in the manifold so that when installed the partitioning means lies in a horizontal plane with the flow heat transfer medium region above the return heat transfer medium region, in that stratification of the heat transfer medium is facilitated with the hotter flow heat transfer medium above the cooler return heat transfer medium, thereby further minimising mixing between the flow and return heat transfer medium.

In on embodiment of the invention each first port for delivering heat transfer medium into the flow heat transfer medium region is provided with a means for directing the heat transfer medium into the flow heat transfer medium region upwardly into the said region.

In another embodiment of the invention each first port through which heat transfer medium is drawn from the flow heat transfer medium region is provided with a means for directing the heat transfer medium being drawn from the flow heat transfer medium region downwardly towards the said first port.

In a further embodiment of the invention each second port for delivering heat transfer medium into the return heat transfer medium region is provided with a means for directing the heat transfer medium being delivered into the return heat transfer medium region downwardly into the said region.

In a still further embodiment of the invention each second port through which heat transfer medium is drawn from the return heat transfer medium region is provided with a means for directing the heat transfer medium being drawn from the return heat transfer medium region upwardly towards the said second port.

In one aspect of the invention at least two pairs of first and second ports are provided for connecting two circuits each having at least one heat exchanger for transferring heat from the heat transfer medium in the respective circuits.

In another aspect of the invention at least two pairs of first and second ports are provided for connecting two circuits each having at least one heat source for heating the heat transfer medium.

In a preferred embodiment of the invention the container comprises a top wall and a bottom wall, the first and second ports being located in the top and bottom walls, the second ports which are located in the top wall, communicating with the return heat transfer medium region through the second connecting pipes, and the first ports which are located in the bottom wall communicating with the flow heat transfer medium region through the first connecting pipes. Preferably, the container comprises a pair of spaced apart end walls joining the top and bottom walls, respective first and second ports being located in end walls.

Additionally the invention provides a central heating system comprising at least two circuits within which a liquid heat transfer medium is circulated, the circuits each having a flow line and a return line, and the manifold according to the invention connecting the at least two circuits together, the flow lines of the respective circuits being connected to the first ports of the manifold, and the return lines of the respective circuits being connected to the second ports.

In one embodiment of the invention at least two circuits of the central heating system comprise at least one heat exchanger each for transferring heat from the heat transfer medium in the respective circuits.

In another embodiment of the invention at least two of the circuits of the central heating system comprise at least one heat source each for heating the heat transfer medium.

Figure 2:
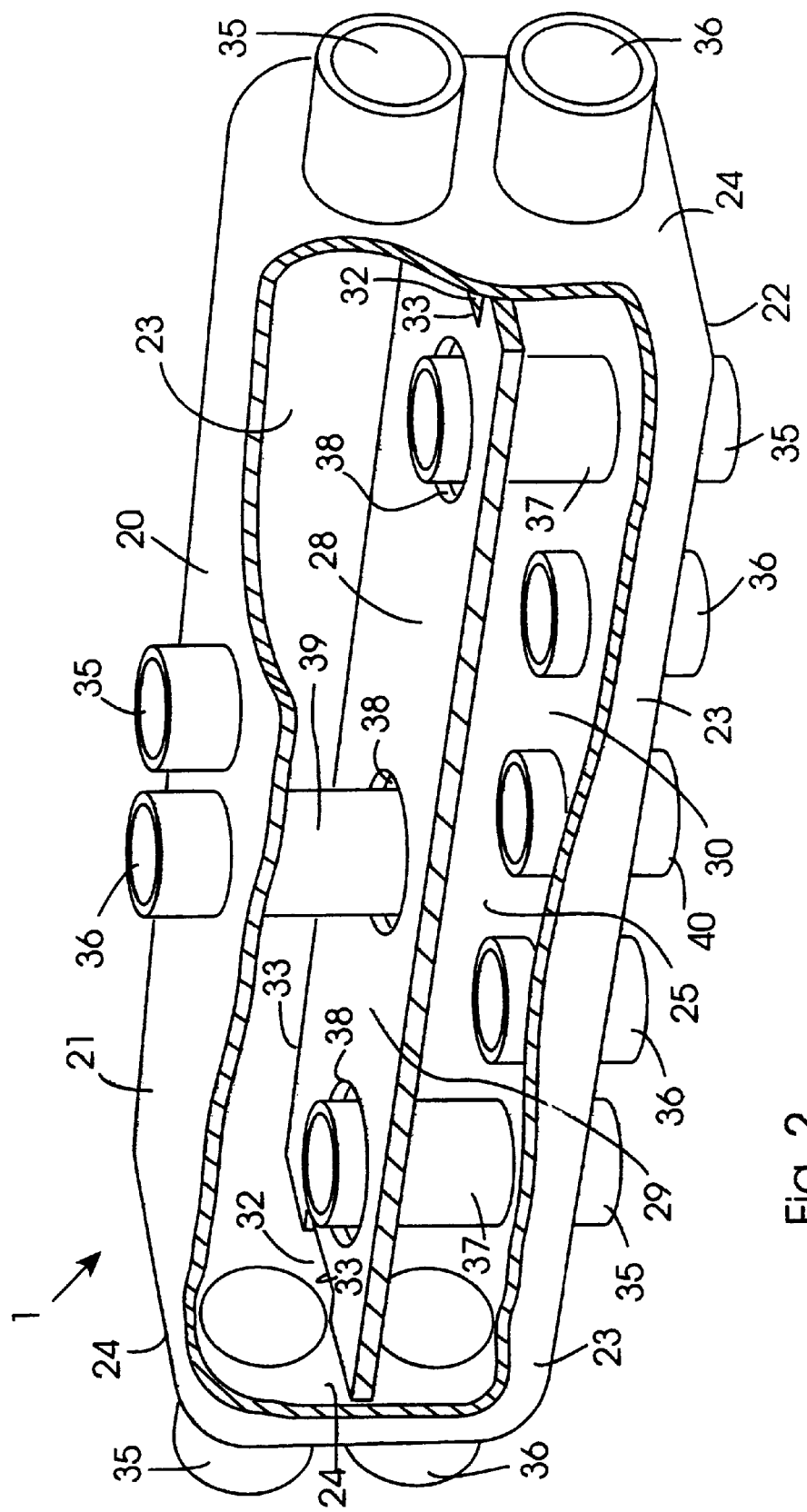
Figure 6:
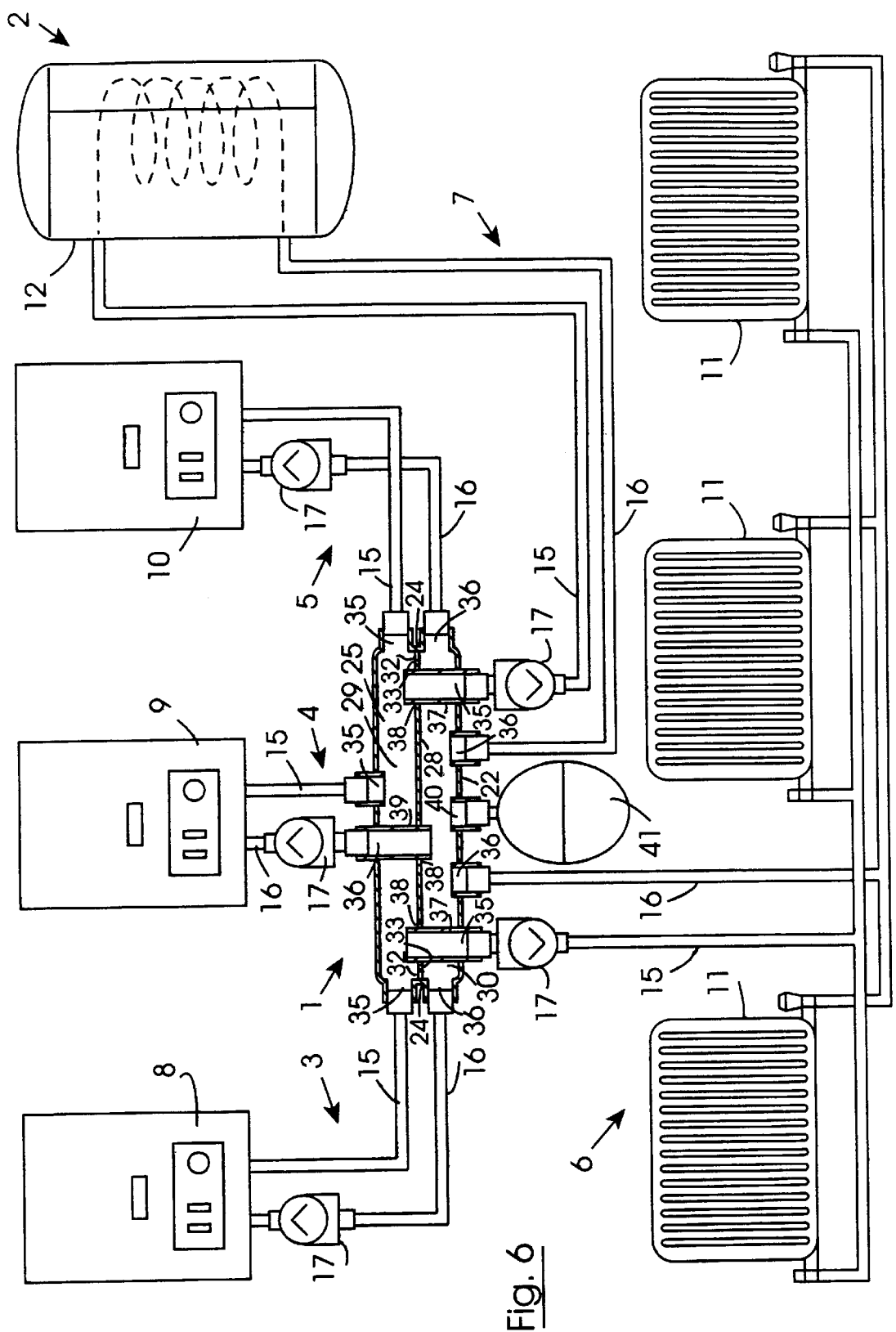
Figure 7:
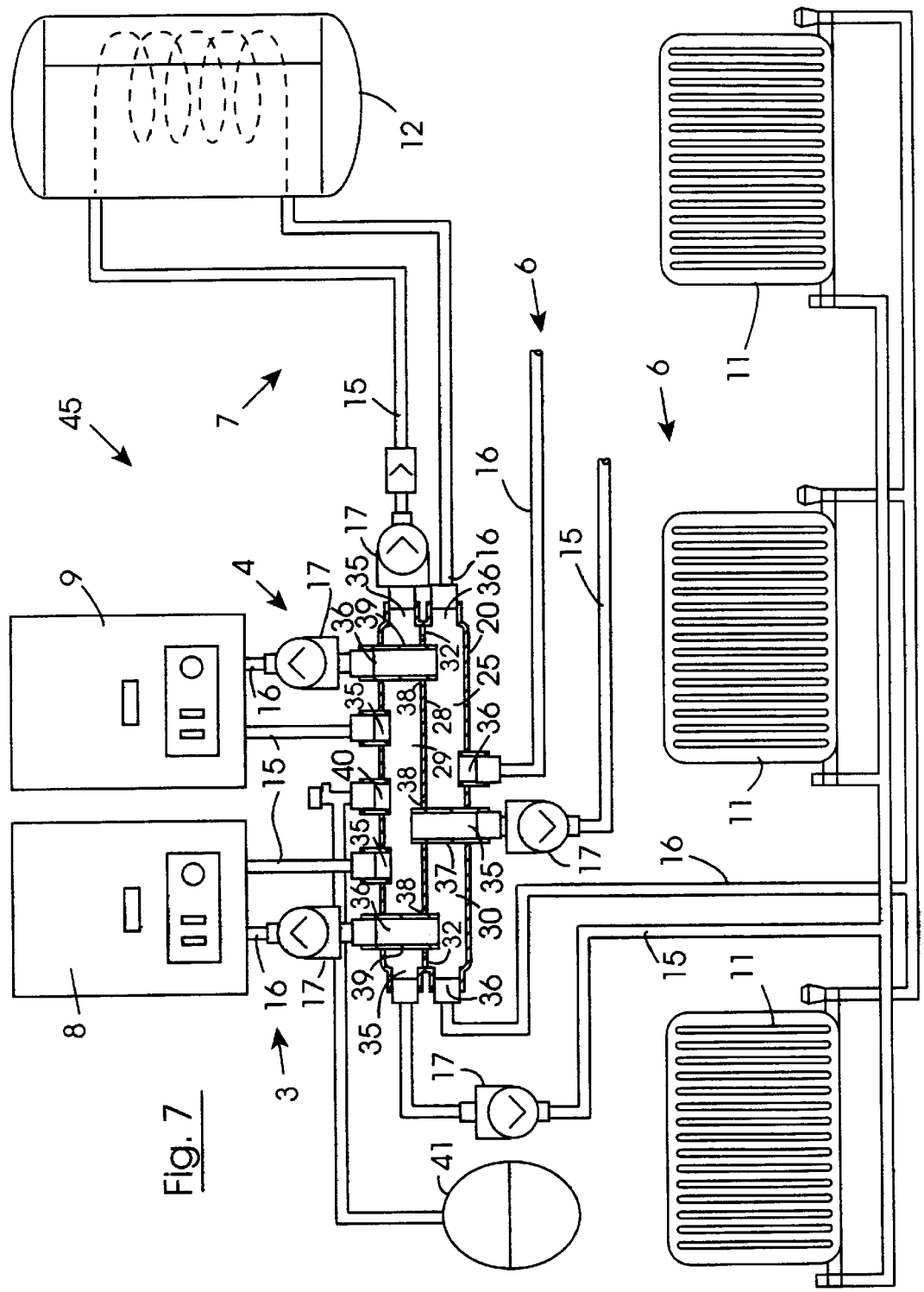
Figure 11:
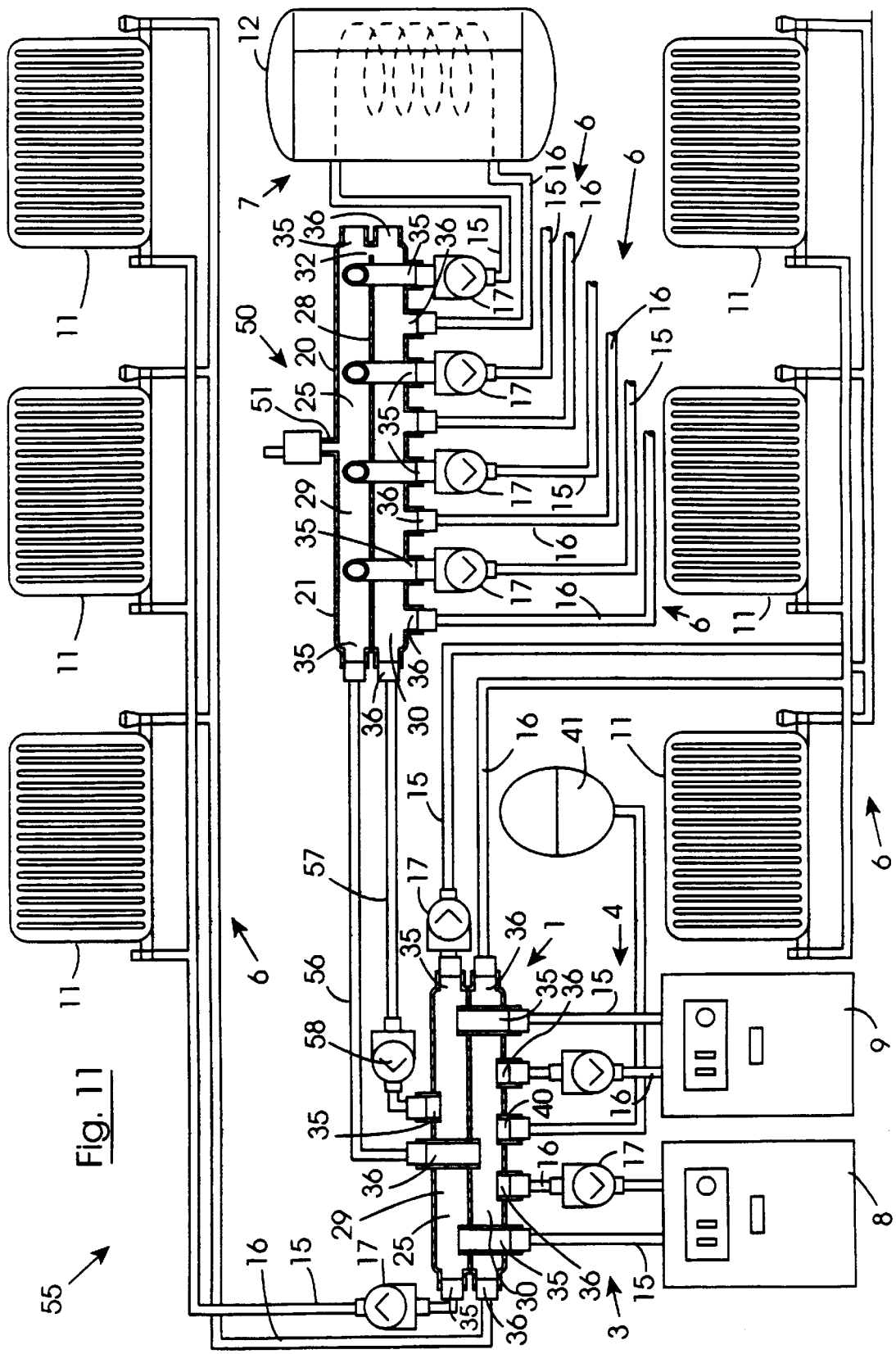
Figures 12, 13:
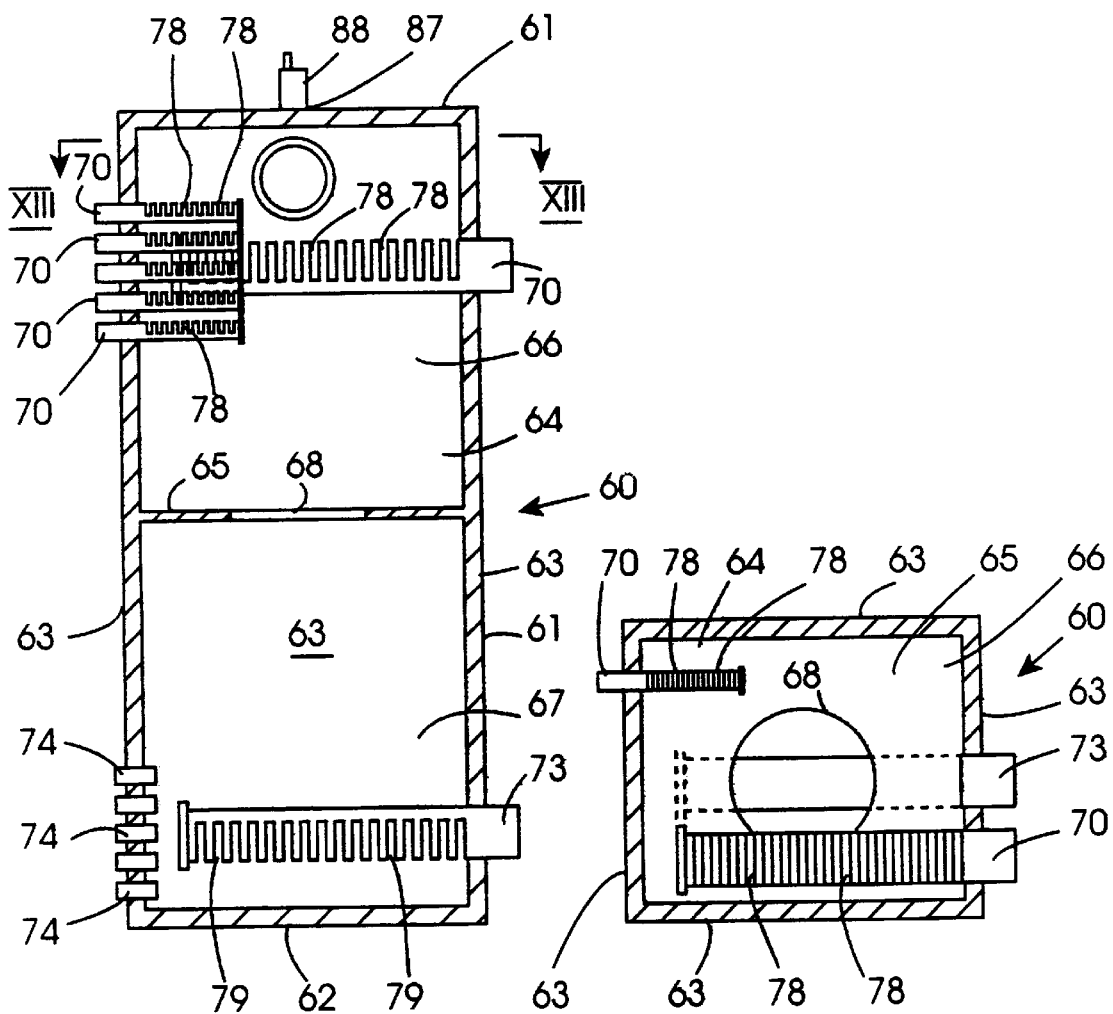
Figure 14:
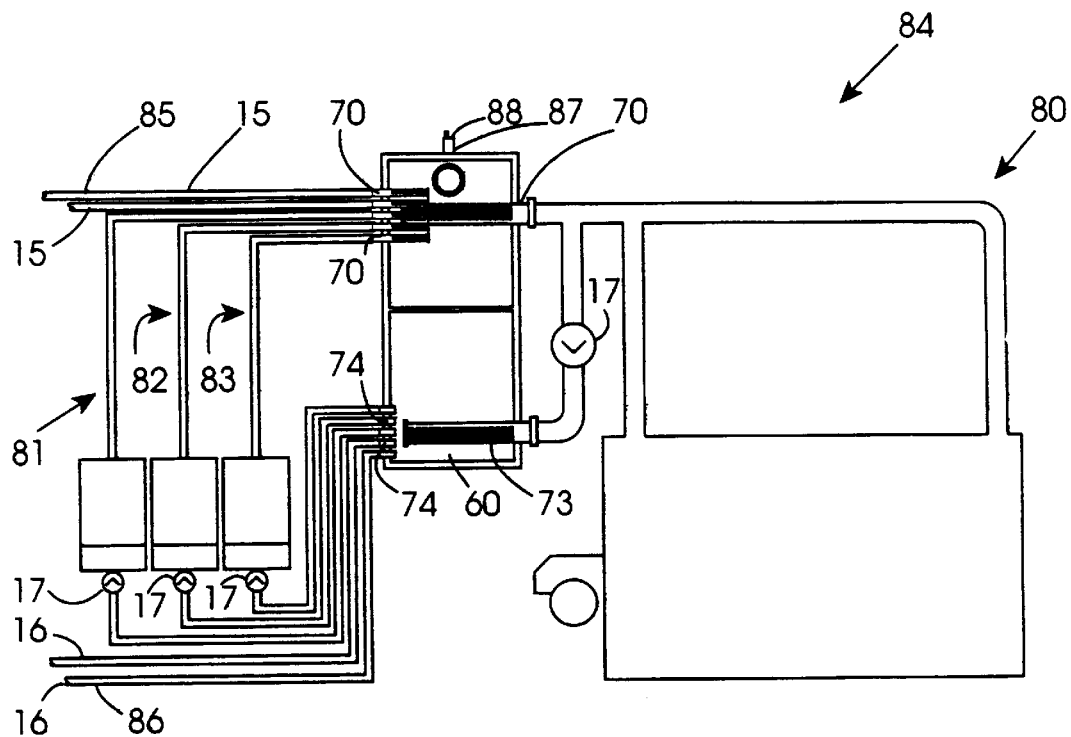
Figure 15:
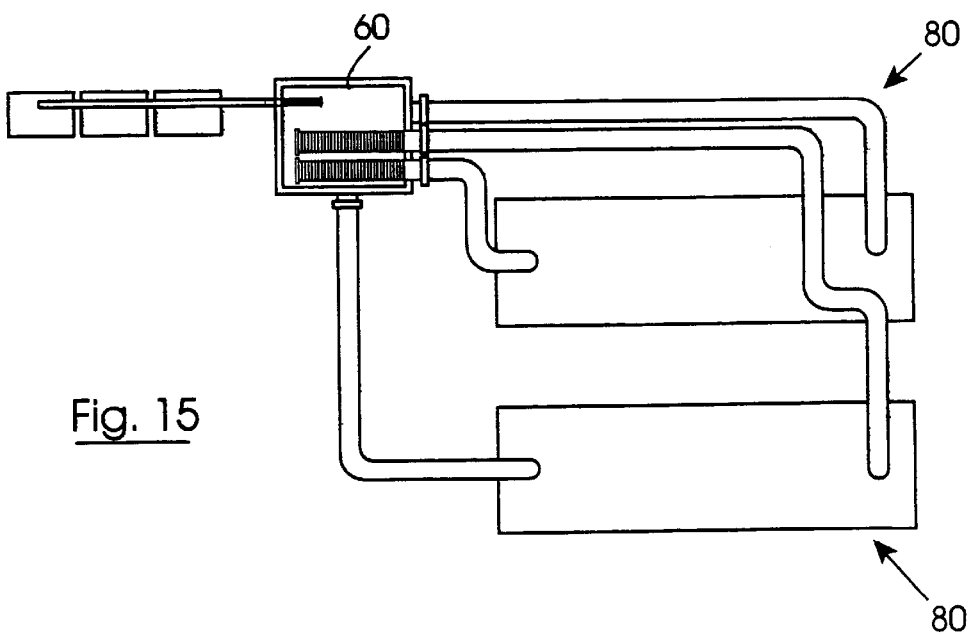

The invention will be more clearly understood from the following description of some preferred embodiments thereof which are given by way of example only, with reference to the accompanying drawings, in which:

FIG. 1 is a perspective view of a manifold according to the invention for connecting together a plurality of circuits of a central heating system, also according to the invention, FIG. 2 is a partly cut away perspective view of the manifold of FIG. 1, FIG. 3 is a sectional side elevational view of the manifold of FIG. 1, FIG. 4 is a sectional plan view of the manifold of FIG. 1 on the line IV—IV of FIG. 3, FIG. 5 is a sectional end elevational view on the line V—V of FIG. 4, FIG. 6 is a circuit diagram of a central heating system according to the invention incorporating the manifold of FIG. 1, FIG. 7 is a circuit diagram of a central heating system according to another embodiment of the invention incorporating the manifold of FIG. 1, FIG. 8 is a view similar to FIG. 3 of a manifold according to another embodiment of the invention, FIG. 9 is a cross-sectional plan view similar to FIG. 4 of the manifold of FIG. 8 on the line IX—IX of FIG. 8, FIG. 10 is a cross-sectional view similar to FIG. 5 of the manifold of FIG. 8 on the line X—X of FIG. 8, FIG. 11 is a circuit diagram of a central heating system according to another embodiment of the invention incorporating the manifolds of FIGS. 1 and 8, FIG. 12 is a cross-sectional side elevational view of a manifold according to a further embodiment of the invention, FIG. 13 is a cross-sectional plan view of the manifold of FIG. 12 on the line XIII—XIII of FIG. 12, FIG. 14 is an elevational view of a part of a circuit of a central heating system incorporating the device of FIGS. 12 and 13, and FIG. 15 is a plan view of the part of the circuit of FIG. 14.

Referring to the drawings and initially to FIGS. 1 to 6 there is illustrated a manifold according to the invention indicated generally by the reference numeral 1 for connecting a plurality of circuits of a central heating system together so that each of the circuits can function independently of the other circuits and some of the circuits can function in association with others of the circuits. In FIG. 6 the manifold 1 is illustrated in a sealed hot water central heating system indicated generally by the reference numeral 2 also according to the invention which comprises three boiler circuits 3, 4 and 5, and two heat exchanger circuits, namely, a radiator heat exchanger circuit 6, an indirect hot water heat exchanger circuit 7. The boiler circuits 3, 4 and 5 each comprise a boiler 8, 9 and 10, respectively. The radiator heat exchanger circuit 6 comprises three heat exchangers, namely, three radiators 11, and needless to say it will be appreciated the heat exchanger circuit 6 may comprise many more radiators 11, and indeed, other heat exchangers, for example, fan heaters and the like. The indirect water heat exchanger circuits 7 comprises an indirect hot water tank 12 for providing domestic hot water. Flow and return pipes 15 and 16, respectively, of the respective circuits 3 to 7 are connected together by the manifold 1 as will be described below. Pumps 17 in the respective circuits 3 to 7, inclusive, circulate heat transfer medium, in this case water in the respective circuits 3 to 7 through the manifold 1 as will be described below.

The manifold 1 comprises an elongated container 20 of suitable plate metal material, typically, steel plate material which comprises a top wall 21, a bottom wall 22, side walls 23 and end walls 24, all of which in combination define an enclosed hollow interior region 25 for containing heat transfer medium, which in this case, is water. A partitioning means, namely, a partition plate 28 also of metal plate material, typically, steel plate material extends transversely across the hollow interior region 25, and divides the hollow interior region 25 into an upper flow water region 29 and a lower return water region 30. The partition plate is welded to the side walls 23. In use, the manifold 1 is mounted so that its longitudinal axis extends horizontally, and the partition plate 28 lies in a horizontal plane so that the flow water region 29 which contains hotter water is above the return water region 30. This facilitates stratification of the water in the hollow interior region 25 so that hotter flow water is above the cooler return water.

A communicating means for communicating the flow and return water regions 29 and 30, respectively, with each other so that the hollow interior region 25 of the manifold forms a neutral pressure point of the central heating system 2 is provided by a pair of communicating openings 32 which are formed at respective ends of the partition plate 28 between end edges 33 of the partition plate 28 and the end walls 24 of the container 20.

A plurality of first and second ports 35 and 36, respectively, are located in the top and bottom walls 21 and 22 and in the end walls 24 for connecting the flow and return pipes 15 and 16 of the circuits 3 to 7, inclusive, with the hollow interior region 25. The first ports 35 all terminate in and communicate with the flow water region 29, and connect the flow pipes 15 into the flow water region 29. The second ports 36 all terminate in and communicate with the return water region 30 and connect the return pipes 16 into the return water region 30. The first and second ports 35 and 36 are arranged in pairs, one pair being located on the top wall 21, two pairs being located on the bottom wall 22, and one pair being located on each of the end walls 24. First connecting pipes 37 extend from the two first ports 35 which are located in the bottom wall 22 and extend through the return water region 30 and through communicating apertures 38 in the partition plate 28, and terminate in the flow water region 29. A second connecting pipe 39 extends from the second port 36 which is located in the top wall 21 and extends through the flow water region 29 and through a communicating aperture 38 in the partition plate 28 to terminate in the return water region 30. Clearance is provided in the communicating apertures 38 around the first and second connecting pipes 37 and 39, respectively, and the partition plate 28, so that the communicating apertures also act as the communicating means between the flow and return water regions 29 and 30, respectively.

A third port 40 located in the bottom wall 22 communicates with the return water region 30 for connecting an expansion vessel 41 of the system 2 into the manifold 1. In the case of a gravity fed central heating system, the header tank would normally be connected to the third port 40.

The manifold 1 forms a neutral pressure point in the central heating system 2 where there is no pressure differential for urging water through any of the circuits. Accordingly, only those circuits, the pumps 17 of which are operating circulate water in their respective circuits and through the manifold 1. Thus, if only one of the boilers 8, 9 and 10 is operating, and its associated pump 17 is circulating water through that boiler and the manifold 1, provided the associated pumps 17 of the remaining two non-operating boilers are not operating no water passes through the non-operating boilers, and thus, there is no danger of a boiler which is not operating acting as a heatsink. That is of course provided that the boiler circuits 3, 4 and 5 of the boilers are incapable of acting under gravity. Likewise, provided the heat exchanger circuit 6 and the indirect heat exchanger circuit 7 are incapable of acting under gravity, no water will circulate through these circuits unless their associated pumps 17 are operating. Accordingly, if only one boiler is operating, for example, the boiler 8, and only the pump 17 of the boiler circuit 3 is operating, and furthermore, none of the pumps 17 of the two circuits 6 and 7 are operating, hot water is merely circulated through the boiler 8 and the manifold 1. The hot water from the boiler 8 enters the flow water chamber 29 through the corresponding first port 35 from the flow line 15 of the circuit 3, and is returned to the boiler 16 from the return water chamber 30 through the corresponding second port 36 into the return line 16. On the pump 17 of the heat exchanger circuit 6 being operated hot water is circulated through the heat exchanger circuit 6. The pump 17 of the heat exchanger circuit 6 draws water from the flow water region 29 through the corresponding first port 35 which is delivered into the flow line 15. Return water from the heat exchanger circuit 6 is returned through the return line 16 and the corresponding second port 36 into the return water region 30. Thus, the flow water drawn from the manifold 1 into the heat exchanger circuit 6 is at substantially the same temperature as the flow water received into the manifold 1 from the boiler 8. Similarly, the return water from the heat exchanger circuit 6 is substantially the same temperature as the return water being returned to the boiler 8. The partition plate 28 separates the hotter flow water from the colder return water, while the communicating openings 32 and the communicating apertures 38 permit flow of water between the flow and return water regions 29 and 30. For so long as the pumps 17 of the boiler circuits 4 and 5 and the indirect heat exchanger circuit 7 remain non-operating there is no water circulating in any of the circuits 4, 5 and 7. However, as soon as any of the pumps 17 of the circuits 4, 5 and 7 are operated, circulation of water takes place in the corresponding circuits in a manner already discussed. Accordingly, the boiler circuits 3, 4 and 5 may be operated independently of each other and independently of the circuits 6 and 7 but also in association with the circuit 6 and 7. Additionally, the circuit 6 and 7 may be operated independently of each other and independently of the boiler circuits 3, 4 and 5, but also in association with the boiler circuits 3, 4 and 5.

Referring now to FIG. 7 there is illustrated a central heating system according to another embodiment of the invention indicated generally by the reference numeral 45. The central heating system 45 is substantially similar to the central heating system 2 of FIG. 6, and similar components are identified by the same reference numerals. In this embodiment of the invention the central heating system 45 comprises two heat exchanger circuits 6, only one of which is illustrated in full, an indirect hot water heat exchanger circuit 7 and two boiler circuits 3 and 4, all of which are connected together by the manifold 1. However, in this embodiment of the invention the manifold 1 is inverted so that the bottom wall 22 forms the top wall of the container 20 and vice versa. Thus, the region which in the embodiment of the invention described with reference to FIGS. 1 to 6 forms the flow water region 29 now forms the return water region 30 and vice versa. However, otherwise, the operation of the manifold 1 and of the central heating system 45 is similar to that already described.

Referring now to FIGS. 8 to 10 there is illustrated a manifold according to a further embodiment of the invention indicated generally by the reference numeral 50. The manifold 50 is substantially similar to the manifold 1 and similar components are identified by the same reference numerals. The main difference between the device 50 and the device 1 is that there are more first and second ports 35 and 36 entering through the bottom wall 22 and none entering through the top wall 21. A vent port 51 is provided in the top wall 21 for connecting to an automatic vent for venting the manifold 50. Additionally, in this embodiment of the invention the communicating means is formed by a communicating opening 32 which extends around two sides and one end of the partition plate 28 and is formed between side edges 52 of the partition plate 28 and corresponding side walls 23 of the container 20, and an end edge 53 of the partition plate 28 and one of the end walls 24 of the container 20. The partition plate 28 is welded to the other end wall 24. Otherwise, the manifold 50 and the connection of the manifold 50 into a central heating system for connecting a plurality of circuits together is identical to that already described.

Referring now to FIG. 11 there is illustrated a central heating system 55 according to another embodiment of the invention which is substantially similar to the central heating system 2 of FIG. 6 and similar components are identified by the same reference numerals. The main difference between this central heating system 55 and the central heating system 2 is that two manifolds, namely, a manifold 1 and a manifold 50 are used for connecting the circuits and the central heating system together. The manifold 1 connects two boiler circuits, namely, a boiler circuit 3 and a boiler circuit 4, and two heat exchanger circuits 6 together. A flow and return pipe 56 and 57, respectively connect the manifold 50 to the manifold 1. A circulating pump 58 in the return pipe 57 circulates water between the two manifolds 1 and 50. The flow pipe 56 is connected to respective first ports 35 of the manifolds 1 and 50, and the return pipe 57 is connected to respective second ports 36 of the manifolds 1 and 50. Three further heat exchanger circuits 6 with associated pumps 17 are connected to respective first and second ports 35 and 36 of the manifold 50 and an indirect heat exchanger circuit 7 with an associated pump 17 is connected to respective first and second ports 35 and 36 of the manifold 50. A further pair of first and second ports 35 and 36 in an end wall 24 of the manifold 50 are blanked off, but may be used for connecting either another circuit 6 or 7 or a boiler circuit as desired.

The pump 58 is interlocked with the pumps 17 of the circuits 6 and 7 which are connected into the manifold 50 so that on a demand for hot water from any of the circuits 6 and 7 which are connected into the manifold 50 the pump 58 is operated for circulating water between the manifolds 1 and 50. Alternatively, the pump 58 may be continuously operated while any of the circuits of the system 55 are in operation.

Referring now to FIGS. 12 and 13 there is illustrated a manifold indicated generally by the reference numeral 60 according to a still further embodiment of the invention. In this embodiment of the invention the manifold 60 comprises a container 61 of steel plate material having top and bottom walls 61 and 62 which are joined by four side walls 63. The top and bottom walls 61 and 62 and side walls 63 define a hollow interior region 64 which is divided by a partitioning means, namely, a partition plate 65 of steel plate material which divides the hollow interior region 64 into an upper flow water region 66 and a lower return water region 67. A communicating means, namely a communicating aperture 68 through the partition plate 65 communicates the flow and return water regions 66 and 67. This manifold 60 is substantially similar to the manifold 1 with the exception that the manifold 60 is essentially mounted with its longitudinal axis extending vertically. However, as can be seen in FIG. 12 the partition plate 65 extends in a horizontal plane for stratifying the flow and return water in similar fashion as the partition plate 28 stratifies the flow and return water in the manifold 1. A plurality of first ports 70 extend into the flow water region 66 for connecting flow pipes of respective circuits which are connected to the manifold 60 into the flow water region 66. Second ports 73 and 74 extending into the return water region 67 connect return pipes of circuits into the return water region 67. In this embodiment of the invention a means for directing the flow water being delivered into the flow water region 66 from the first ports 70 upwardly into the flow water region 66 comprises a plurality of slots 78 in the upper half of the first ports 70. The slots 78 deliver flow water into the first ports 70 downwardly from the flow water region 66 into circuits which comprise heat exchangers. The advantage of providing the water directing slots 78 in this fashion is that it further facilitates in stratifying the water in the hollow interior region 64 so that the hottest water is delivered into and drawn off from the top of the flow water region 66 by the respective first ports of the flow lines of the circuits. In similar fashion, a means for directing return water downwardly into the return water region 67 from the second ports 73, and for receiving return water upwardly into the second ports 73 comprises slots 79 similar to the slots 78 but located in the lower half of the second port 73. The advantage of this is that it ensures that the coldest water is returned to and/or drawn from the lowest part of the return water region 67.

FIGS. 13 and 14 illustrate four boiler circuits 80 to 83, respectively, connected in a central heating system 84 by the manifold 60. Two heat exchanger circuits 85 and 86 are also connected into the central heating system 84 by the manifold 60. Only the flow and return pipes 15 and 16 of the heat exchanger circuits 85 and 86 are illustrated.

A third port 87 to the flow water region 66 is provided for receiving an automatic venting valve 88 for venting the system. One of the advantages of providing a vent in the manifold 60, and indeed, in the manifold 50 is that by virtue of the fact that the manifolds essentially form a neutral pressure point in the central heating system, air tends to expand out of the water in the manifolds, and thus, can be readily easily vented from the system.

I claim:

1. A manifold (1) for connecting at least two circuits (3 to 7) of a liquid, heat transfer medium central heating system (2) in which the circuits (3 to 7) each comprise a flow line (15) and a return line (16), so that at least some of the circuits (3 to 7) can function independently of each other and at least some of the circuits (3 to 7) can function in association with each other, the manifold (1) comprising a container (20) defining an enclosed hollow interior region (25) for the heat transfer medium, and a plurality of pairs of first and second ports (35, 36, 70, 73) to the hollow interior region (25) for connecting the respective circuits (3 to 7) into the hollow interior region (25), the first ports (35, 70) being provided for connecting the flow lines (15) of the respective circuits (3 to 7) to the hollow interior region (25), and the second ports (36, 73) being provided for connecting the return lines (16) of the respective circuits (3 to 7) into the hollow interior region (25), characterised in that a partitioning means (28) extends transversely of the hollow interior region (25) for dividing the hollow interior region (25) into a flow heat transfer medium region (29) and a return heat transfer medium region (30), the respective regions (29, 30) communicating with each other through a communicating means (32, 38) in the partitioning means (28), the first ports (35, 70) communicating with the flow heat transfer medium region (29), and the second ports (36, 73) communicating with the return heat transfer medium region (30) and at least one of the first ports (35, 70) is located in a wall (22) of the container (20) which forms part of the return heat transfer medium region (30), and a first connecting pipe (37) extends from each of said first ports (35, 70) through the return heat transfer medium region (30) and through the partitioning means (28) for communicating the respective said first ports (35, 70) with the flow heat transfer medium region (29).

2. A manifold (1) as claimed in claim 1 characterised in that the partitioning means (28) comprises a partition plate (28).

3. A manifold (1) as claimed in claim 2 characterised in that the partition plate (28) extends substantially completely across the hollow interior region (25).

4. A manifold (1) as claimed in claim 1 characterised in that the communicating means (32,38) is provided by at least one communicating aperture (38) which is formed in and extends through the partitioning means (28) for communicating the respective regions (29,30) with each other.

5. A manifold (1) as claimed in claim 1 characterised the communicating means (32,38) is provided by a communicating opening (32) which is formed between the partitioning means (28) and a wall of the container (20).

6. A manifold (1) as claimed in claim 1 characterised in that the first and second ports (35,36) are located in pairs of adjacent first and second ports (35,36).

7. A manifold (1) as claimed in claim 1 characterised in that at least one of the second ports (36, 73) is located in a wall (21) of the container (20) which forms part of the flow heat transfer medium region (29), and a second connecting pipe (39) extends from each of said second ports (36, 73) through the flow heat transfer medium region (29) and through the partitioning means (28) for communicating the respective said second ports (36, 73) with the return heat transfer medium region (30).

8. A manifold (1) as claimed in claim 1 characterised in that the partitioning means (28) lies in a plane which extends horizontally, the flow heat transfer medium region (29) being located above the return heat transfer medium region (30) for stratifying the heat transfer medium in the hollow interior region (25) so that the hotter heat transfer medium is in the flow heat transfer medium region (29).

9. A manifold (1) as claimed in claim 1 characterised in that the container (20) is an elongated container (20).

10. A manifold (1) as claimed in claim 9 characterised in that the container (20) is adapted for mounting with its longitudinally extending axis extending substantially horizontally.

11. A manifold (1) as claimed in claim 1 characterised in that the container (20) is adapted for mounting with its longitudinally extending axis extending substantially vertically.

12. A manifold (1) as claimed in claim 1 characterised in that each first port (35, 70) for delivering heat transfer medium into the flow heat transfer medium region (66) is provided with a means (78) for directing the heat transfer medium into the flow heat transfer medium region (66) upwardly into the said region (66).

13. A manifold (1) as claimed in claim 1 characterised in that each first port (35, 70) through which heat transfer medium is drawn from the flow heat transfer medium region (66) is provided with a means (78) for directing the heat transfer medium being drawn from the flow heat transfer medium region (66) downwardly towards the said first port (35, 70).

14. A manifold (1) as claimed in claim 1 characterised in that each second port (36, 73) for delivering heat transfer medium into the return heat transfer medium region (67) is provided with a means (79) for directing the heat transfer medium being delivered into the return heat transfer medium region (67) downwardly into the said region (67).

15. A manifold (1) as claimed in claim 1 characterised in that each second port (36, 73) through which heat transfer medium is drawn from the return heat transfer medium region (67) is provided with a means for directing the heat transfer medium being drawn from the return heat transfer medium region (67) upwardly towards the said second port (36, 73).

16. A manifold (1) as claimed in claim 1 characterised in that at least two pairs of first and second ports (35,36) are provided for connecting two circuits (6,7) each having at least one heat exchanger for transferring heat from the heat transfer medium in the respective circuits (6,7).

17. A manifold (1) as claimed in claim 1 characterised in that at least two pairs of first and second ports (35, 36, 70, 73) are provided for connecting two circuits (3,4,5) each having at least one heat source for heating the heat transfer medium.

18. A manifold (1) as claimed in claim 1 characterised in that the container (20) comprises a top wall (21) and a bottom wall (22), the first and second ports (35, 36, 70, 73) being located in the top and bottom walls (21,22), the second ports (36) which are located in the top wall (21), communicating with the return heat transfer medium region (30) through the second connecting pipes (39), and the first ports (35, 70) which are located in the bottom wall (22) communicating with the flow heat transfer medium region (29) through the first connecting pipes (37).

19. A manifold (1) as claimed in claim 18 characterised in that the container (20) comprises a pair of spaced apart end walls (24) joining the top and bottom walls (21,22), respective first and second ports (35, 36, 70, 73) being located in end walls (24).

20. A central heating system as claimed in claim 19 characterised in that at least two circuits (6,7) of the central heating system (2) comprise at least one heat exchanger each for transferring heat from the heat transfer medium in the respective circuits (6,7).

* * * * *